United States Patent [19]

Greer, Jr.

[11] Patent Number: 4,583,207

[45] Date of Patent: Apr. 15, 1986

[54] MAGNETOHYDRODYNAMIC GEOPHONE

[76] Inventor: Sedley J. Greer, Jr., 1917 Osage Dr., North Little Rock, Ark. 72116

[21] Appl. No.: 444,988

[22] Filed: Nov. 29, 1982

[51] Int. Cl.$^4$ .............................................. G01V 1/18
[52] U.S. Cl. .................................... 367/178; 73/654; 324/207; 367/188
[58] Field of Search ......... 73/517 A, 516 R, 516 LM, 73/652, 654; 181/401; 367/178, 185, 187, 188, 166; 324/204, 207

[56] References Cited

U.S. PATENT DOCUMENTS 3,930,218 12/1975 Hall, Jr. .............................. 367/188
4,419,895 12/1983 Fuller .............................. 73/517 A

OTHER PUBLICATIONS

Graf "Modern Dictionary of Electronics" Fourth Edition, Howard W. Sams & Co., Inc., p. 184.

Primary Examiner—Salvatore Cangialosi
Assistant Examiner—K. R. Kaiser
Attorney, Agent, or Firm—Stephen D. Carver

[57] ABSTRACT

A magnetohydrodynamic geophone for seismological detection. The geophone is of rigid shock resistant design, including a sealed, rigid generally conically shaped housing which is adapted to be firmly embedded within the ground in bedrock or the like, in or adjacent to an area to be seismologically monitored. The shock resistant housing includes an isolated interior for receiving an MHD sensor which detects the seismological vibration. The sensor includes a generally tubular conduit containing an electrically conductive fluid, preferably mercury or an electrolyte. A very strong magnetic field is set up perpendicularly with respect to the plane occupied by the conduit. An electric field is generated through the Faraday Effect in response to vibrations. Preferably the conduit is of ring shaped configuration, and the conductive fluid is continuously circulated throughout it. A steady state operating point is thus established, and perturbations established by vibration are detected by associated high gain amplification circuitry which processes the electric field signals sensed by electrodes attached to the conduit. The electrodes are attached to the conduit and oriented generally perpendicular with respect to the magnetic field.

14 Claims, 10 Drawing Figures

MAGNETOHYDRODYNAMIC GEOPHONE

BACKGROUND OF THE INVENTION

The present invention is directed to a geophone for monitoring seismological disturbances. More particularly, the present invention is concerned with a magnetohydrodynamic activated geophone of extremely shock resistant characteristics.

In the prior art a variety of seismological sensing apparatus has been proposed for monitoring various forms of disturbances or shock waves. These shock waves may be generated in response to earthquakes, tests of nuclear warheads, or from other conventional sources such as the hydraulic vibrators or conventional explosions employed in the oil industry to locate sub-surface oil deposits.

When an earthquake occurs, a sudden release of accumulated strain results in the propagation of a number of different types of seismological waves. Geophones have previously been employed to measure various parameters associated with earthquakes, such as the velocity of sub-surface movement of waves, the rate of change of the velocity, and the duration of the event. Shear waves, or S-waves, are the primary signal generated by an earthquake. When an extreme disturbance occurs in an homogeneous environment, a spherical front is generated, and a P-wave results. Such a wave is characterized by alternating compression and rarefaction through the sub-surface of the earth, somewhat similar to the structure of sound waves in air. Nuclear blasts in conjunction with underground tests primarily radiate P-waves.

At the interface of the earth with air Rayleigh waves are generated. Such waves are associated with both earthquakes and underground nuclear tests. Love waves are generated primarily from earthquakes, and are generally transverse to the direction of travel of Rayleigh waves. A variety of other complex waveforms resulting from reflection and refraction effects are also known in seismology. A useful discussion of such waves, along with recitation of the possibility of monitoring such waves for purposes of policing a total test ban treaty, is discussed in *Scientific American*, volume 247, number 4, pages 47–55, October, 1982.

In the prior art a variety of geophones and/or seismometers have been proposed. Essentially known prior art devices include a rigid, generally conically shaped outer casing or enclosure housing an internal element of some form for sensing vibration. A variety of different sensors and/or transducers have been proposed to originate a signal corresponding to seismological vibration. For example, Hayes in U.S. Pat. No. 1,980,993 discloses a sealed chamber in which pneumatic pressure results in the generation of an electrical signal in response to seismological vibration. Bound in U.S. Pat. No. 3,806,909 employs an internal piezoelectric element sensitive to soil stresses for generating a seismological responsive signal. Massa in U.S. Pat. No. 3,360,772 proposes a geophone in which a bilaminar piezoelectric element is suspended across an interior within the geophone housing for sensing vibrations and producing a proportional electrical signal.

The seismometer proposed by Baltosser in U.S. Pat. No. 2,748,370 contemplates the use of an electromagnetic sensor system interiorly of the casing for producing vibration sensing. Ording in U.S. Pat. Nos. 2,712,124 and 2,759,552 also discloses electromagnetic means for generating a proportional electrical signal. Sanderson in U.S. Pat. No. 2,677,270 senses vibration in response to the differential conductivity within a fluid medium as a gaseous bubble confined within a fluid chamber moves about in response to sudden seismological vibration. Other less relevant art known to me includes U.S. Pats. Nos. 2,683,867 and 3,474,405.

SUMMARY OF THE INVENTION

The present invention comprises a rigid, shock resistant geophone adapted to sense seismic vibrations.

Preferably a rigid, shock resistant enclosure is formed from a pair of generally conically shaped members, which are flangibly interconnected with one another during assembly. The housing includes a sealed interior, in which a magnetohydrodynamic seismological sensor is firmly disposed. The heart of the sensor is a generally tubular conduit containing an electrically conductive fluid such as mercury or an electrolyte. Preferably the conduit is of ring shaped dimensions, and fluid is preferably moved within the ring by a pump mechanism. A very strong magnetic field is set up perpendicularly with respect to the plane occupied by the conduit. Such a B field may appropriately be established by a pair of conventional magnets which have opposite poles disposed in a line generally normal to the plane of the conduit. One or more pairs of electrodes are secured to the conduit in a position normal to the magnetic field whereby to sense perturbations. Although operation of the device occurs in the fluid static state, it is preferred that the electrically conductive fluids within the conduit be continuously circulated for more sensitive sensing.

A pair of electrodes secured to sides of the conduit are coupled to a very high gain amplifier circuit for generating a signal suitable for analog-to-digital conversion. Preferably the digital signal is radioed to a remote position through a conventional digital transmitter where the information derived from the seismometer or geophone may be decoded.

Because of the particular configuration I have designed, extremely shock resistant characteristics are obtained. For example, known geophones of the electromagnetic type relatively easily sustain damage in response to severe shocks encountered when they are dropped. The seismological vibrations sensed by geophones are relatively small compared to the shock a geophone would experience if it were dropped out of an airplane, for example. My design resists shock induced damage.

Thus a broad object of the invention is to provide a shock resistant geophone which may monitor seismological information or shock waves generated in response to earthquakes, nuclear tests, other hydroacoustic soundings and the like.

A more particular object of the present invention is to provide a magnetohydrodynamic geophone of extremely shock resistant characteristics.

Yet another object of the present invention is to provide a geophone of the characteristics discussed above which may be reliably deployed in conjunction with an aircraft.

A still further object of the present invention is to provide a reliable and shock resistant geophone which will reliably operate on a tactical nuclear battlefield. It is a feature of the invention that its basic sensing mechanism is resistant to the EMP pulses generated when a nuclear weapon is detonated.

Another object is to provide a geophone of the type discussed of very wide band sensing characterisitics.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
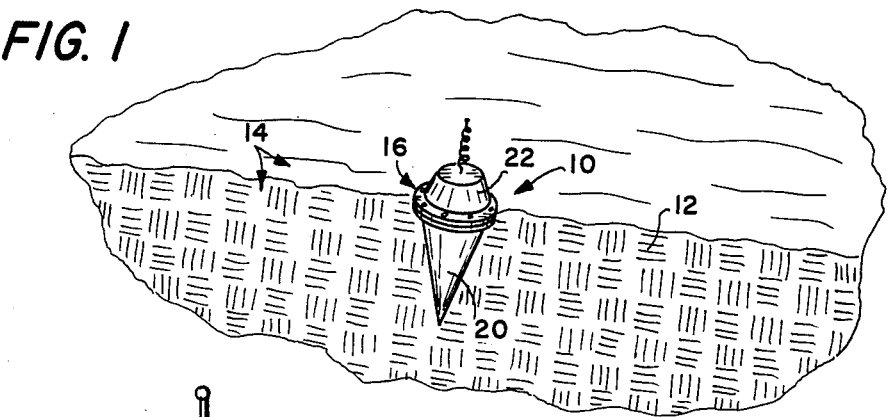
FIG. 1 is a pictorial view illustrating a geophone constructed in accordance with the preferred teachings of this invention in proper placement within an area to be seismologically monitored.
Figure 2:
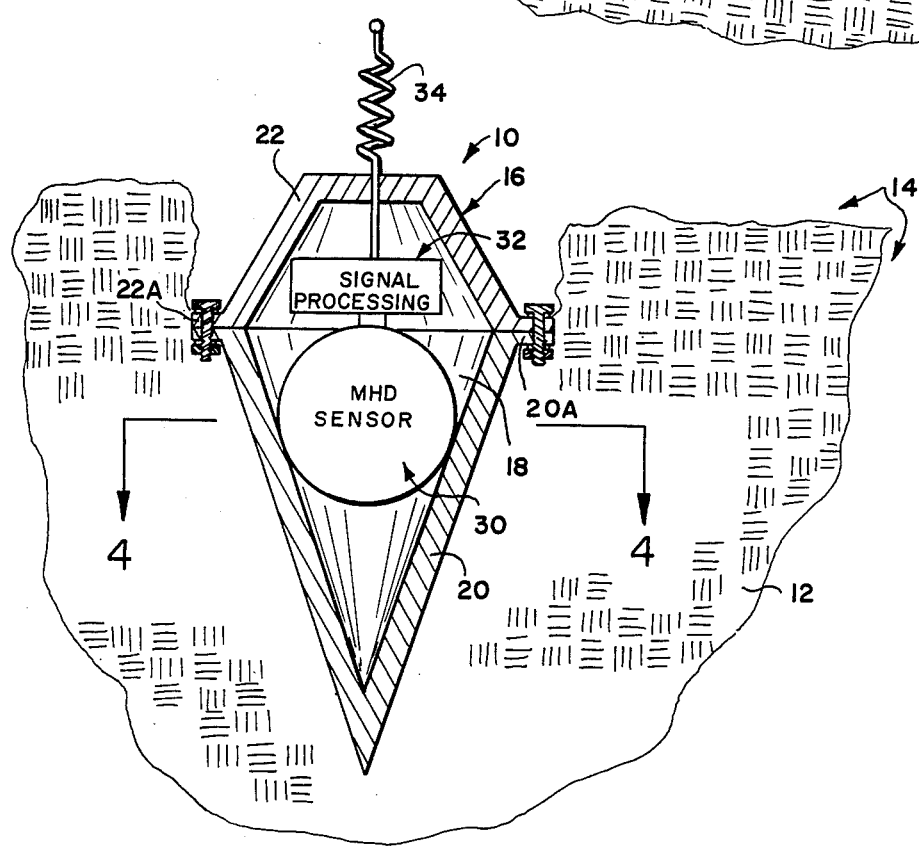
FIG. 2 is an enlarged, fragmentary sectional view of the geophone shown in FIG. 1.
Figure 3:
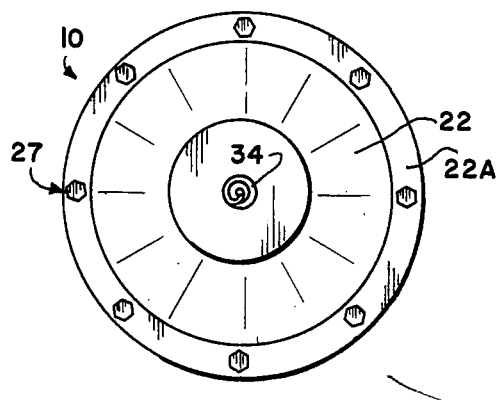
FIG. 3 is a top plan view of the geophone shown in FIGS. 1 and 2.

With initial reference to FIGS. 1-3, a geophone constructed in accordance with the preferred teachings of the present invention has been generally designated by the reference numeral 10. Geophone 10 is adapted to be firmly embedded within the unconsolidated bedrock 12 within a region 14 requiring seismological monitoring. The geophone 10 includes a rigid, preferably metallic, shock resistant housing 16 having an airtight and watertight, sealed interior 18. Housing 16 is formed from a generally conical bottom 20 which is flangibly coupled to frustrum-like top 22. Thus flange portion 22A is bolted to flange member 20A by a plurality of nut and bolt combinations 27 of conventional configuration. A magnetohydrodynamic sensor, which will be discussed in detail hereinafter, has been generally designated by the reference numeral 30. Seismological vibrations detected by sensor 30 are amplified and processed by a circuit 32 for transmittal to a remote location through a conventional antenna 34. Although a variety of antennas will be useful, a helical antenna or equivalent is intended for communication with a companion satellite monitor. It is contemplated that standard vertical whip antennas or equivalents may be employed in conjunction with land based UHF or VHF radio monitoring.

Sensor 30 is in the form of a generally spherical body 31 properly machined to admit a generally ring shaped dual diameter tubular conduit, generally designated by the reference numeral 34. As best viewed in FIG. 5, conduit 34 includes a first half generally designated by the reference numeral 36, having a predetermined diameter significantly greater than the diameter of accompanying ring half 38. An electrically conductive fluid such as mercury or a chemical electrolyte 40 is disposed within the conduit 34.

Figure 4:
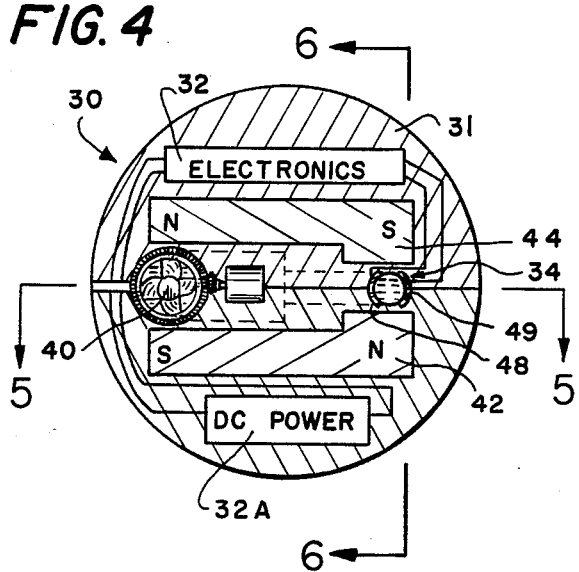
FIG. 4 is an enlarged fragmentary view illustrating the magnetohydrodynamic sensor, taken generally along the line 4—4 of FIG. 2.

A pair of magnets are disposed above and below the conduit 34. As best viewed in FIG. 4, for example, the position of the illustrated north and south poles generate an extremely effective magnetic field across the conduit, and the magnetic field is perpendicular to the plane occupied by the conduit. Because of the opposed alignment of magnets 42 and 44, the magnetic field vector directed across conduit ring portion 38 will be opposite in direction from the magnetic field directed across larger diameter conduit ring portion 36. As best viewed in FIGS. 4 and 5, the conduit 34 includes at least one pair of electrodes 48, 49 for determining the electric field generated from magnetohydrodynamics generally normal to the direction of the magnetic field set up by magnets 44 and 42 across the conduit 34. In response to vibration experienced by sensor 30, perturbations in the fluid 40 within conduit 34 are sensed and amplified by circuit 32.

Figure 5:
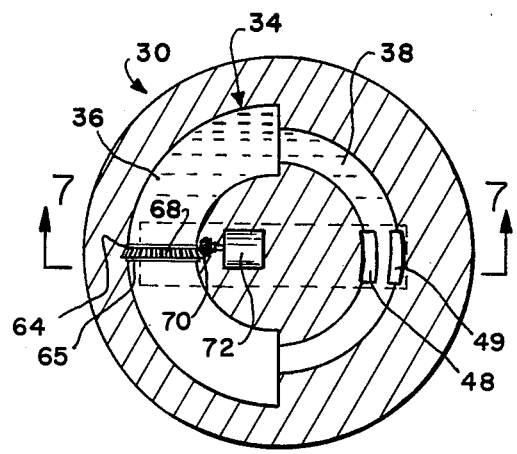
FIG. 5 is a sectional view taken generally along line 5—5 of FIG. 4.
Figure 6:
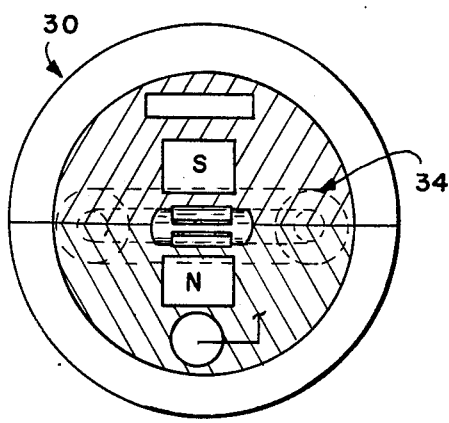
FIG. 6 is a sectional view taken generally along line 6—6 of FIG. 4.
Figure 7:
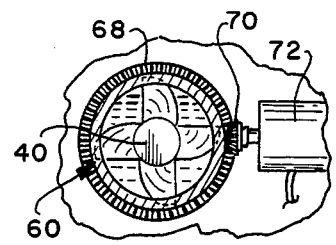
FIG. 7 is an enlarged, fragmentary sectional view taken generally along line 7—7 of FIG. 5.

With reference now to FIGS. 5 and 7, means are preferably provided for circulating fluid within the ring shaped conduit 34. Circulation is necessary to enhance the usefulness of the magnetohydrodynamic Effect by providing a fluid current velocity. It is contemplated that a variety of different pumps may be used by the present invention. One such pump which may be employed includes a turbine blade, generally designated by the reference numeral 60 which is rotatably sealed by the mated terminal ends 64, 65 (FIG. 5) of opposite halves of ring larger diameter portion 36. A conventional ring gear 68 driven by worm 70 which is in turn controlled by motor 72 induces fluid motion interiorly of conduit 34. It should be appreciated that because of the larger diameter geometry of ring segment 36 relative to segment 38, a relatively small fluid velocity induced by turbine 60 within conduit portion 36 will be translated into a relatively high velocity in the lower volume ring segment 38 in fluid flow communication with segment 36. Thus the velocity of electrolyte or mercury transmitted through the ring half 38 between electrodes 48 and 49 will be relatively significant in the operating state.

Figure 8:
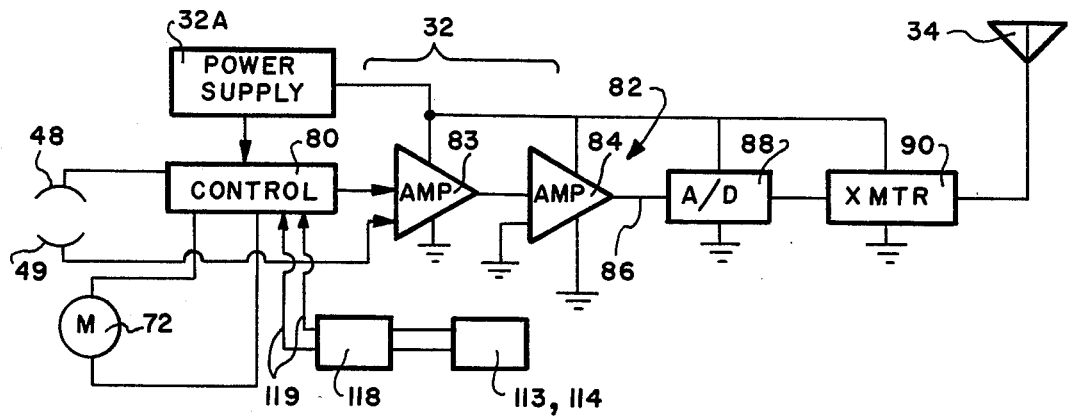
FIG. 8 is an electrical schematic diagram of a preferred control and radio circuit.

With reference now to FIG. 8, the circuit 32 is of relatively straightforward design. It must be appreciated that a variety of other sensing circuits may be employed with equal utility in conjunction with the MHD system of sensor 30. Circuit 32 includes a conventional battery power supply 32A which operates a conventional control circuit 80 for operating motor 72. Electrodes 48, 49 transmit their signals through control network 80 to a high gain differential amplifier circuit, generally designated by the reference numeral 82. This circuit includes a pair of operational amplifiers 83, 84 connected in cascade. Their analog output appearing on line 86 is transmitted to a conventional analog-to-digital converter 88 which operates at conventional pulse width modulated transmitter 90 for telemetry output via antenna 34, previously discussed.

Figure 9:
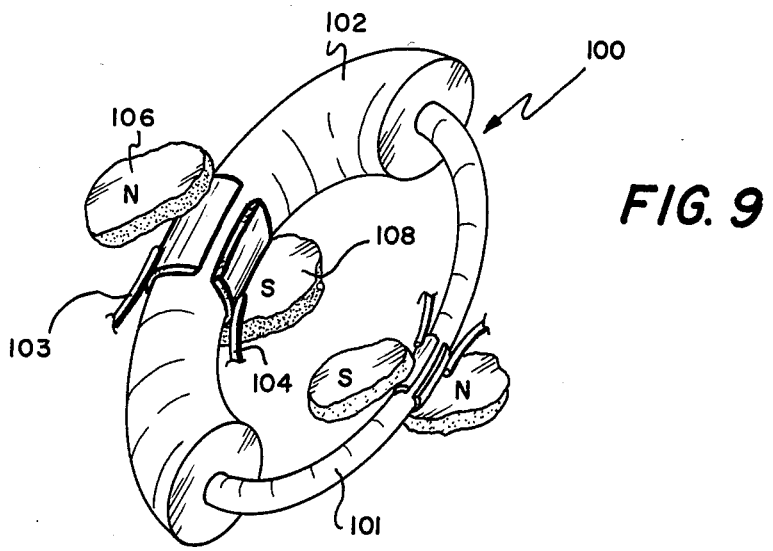
FIG. 9 is a pictorial view of an alternative sensor conduit employing reverse magnetohydrodynamic drive; and, FIG. 10 is a pictorial view of an alternative conduit employing a fluid vibration system.

An alternative sensing conduit, also generally in the form of a toroid, is designated generally by the reference numeral 100 (FIG. 9). The larger diameter segment 102 includes a pair of electrodes (in electrical communication with the fluid within conduit 100) coupled to leads 103, 104. Magnet poles 106, 108 established a magnetic B field normal to the plane of conduit 100. An electrical voltage applied to lines 103, 104 thus establishes an electric field perpendicular to the magnetic field, and a reverse magnetohydrodynamic effect is established. In other words, a small flow of the electrically conductive fluid is established electrically. Relatively low fluid velocities within conduit segment 102 are translated to higher velocities within conduit segment 101, because of its lower diameter.

Figure 10:
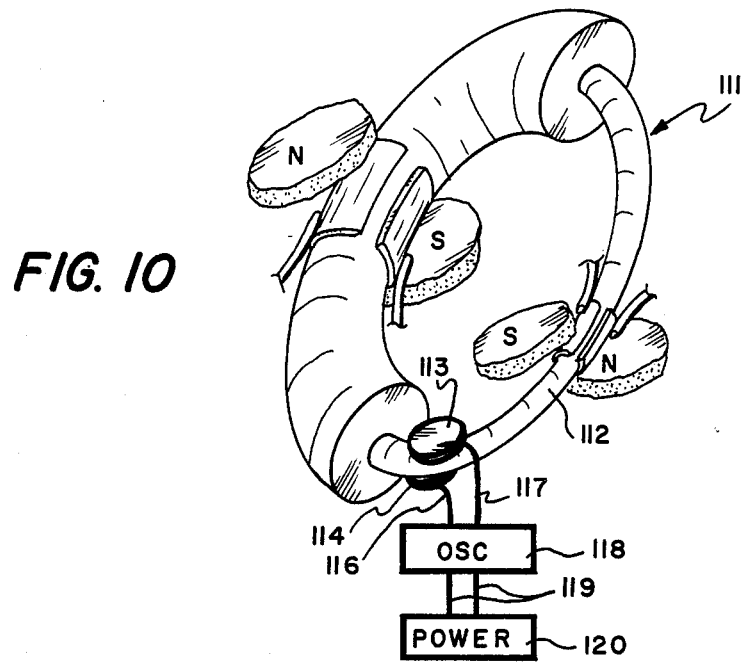

In FIG. 10 a further modification is shown. To generate molecular movement of the fluid within conduit 111, a pair of piezoelectric elements 113, 114 are located on opposite sides of the conduit segment 112; leads 116, 117 apply voltage from oscillator 118 across elements 113, 114 to generate vibrations. Power is supplied across lines 119 from source 120.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A geophone comprising:
    a rigid, shock resistant housing having a sealed interior, the housing adapted to be firmly embedded within the ground in an area to be seismologically monitored;
    a magnetohydrodynamic seismological sensor disposed within said housing for detecting seismological waves, said sensor comprising:
        a generally tubular conduit containing an electrically conductive fluid, said conduit occupying a plane;
        magnetic means for establishing a magnetic field generally perpendicular to said plane of said conduit; and,
        means for sensing perturbations in the electric field normal to said magnetic field for monitoring seismic disturbances, said last mentioned means comprising:
            electrode means oriented transversely with respect to said magnetic field for sensing said electrical field; and,
            high gain amplifier means for greatly amplifying said perturbations.

2. The geophone as defined in claim 1 including analog-to-digital converter means for digitizing the perturbation signal derived from said electrode means and digital transmitter means for radioing said signal to a remote location.

3. The geophone as defined in claim 2 wherein said tubular conduit is in the form of a ring.

4. The geophone as defined in claim 3 including mechanical pump means for continuously circulating fluid throughout said conduit.

5. The geophone as defined in claim 4 wherein half of said ring is of a first known diameter and the other half of said ring is of a smaller known diameter.

6. The geophone as defined in claim 4 wherein said pump means comprises a mechanical turbine.

7. An MHD geophone comprising:
    a rigid, shock resistant housing having a sealed interior, the housing adapted to be firmly embedded within the ground in an area to be seismologically monitored;
    a magnetohydrodynamic seismological sensor disposed within said housing for detecting seismological waves, said sensor comprising:
        a generally tubular conduit containing an electrically conductive fluid, said conduit being in the form of a ring and occupying a plane;
        magnetic means for establishing a magnetic field generally perpendicular to said plane of said conduit; and,
        means for sensing perturbations in the electric field normal to said magnetic field for monitoring seismic disturbances.

8. The geophone as defined in claim 7 including mechanical pump means for continuously circulating fluid throughout said conduit.

9. The geophone as defined in claim 8 wherein half of said ring is of a first known diameter and the other half of said ring is of a smaller known diameter.

10. The geophone as defined in claim 8 wherein said pump means comprises means for establishing a reverse magnetohydrodynamic effect associated with said conduit means.

11. The geophone as defined in claim 10 including means for continuously vibrating said electrically conductive fluid, said last mentioned means comprising piezoelectric oscillation means.

12. A geophone comprising:
    a rigid, shock resistant housing having a sealed interior, the housing adapted to be firmly embedded within the ground in an area to be seismologically monitored;
    a magnetohydrodynamic seismological sensor disposed within said housing for detecting seismological waves, said sensor comprising:
        a generally tubular conduit containing an electrically conductive fluid, said conduit occupying a plane;
        magnetic means for establishing a magnetic field generally perpendicular to said plane of said conduit;
        means for sensing perturbances in the electric field normal to said magnetic field for monitoring seismic disturbances; and,
        means for continuously vibrating said electrically conductive fluid, said last mentioned means comprising piezoelectric oscillation means.

13. The geophone as defined in claim 12 wherein said sensor includes:
    electrode means oriented transversely with respect to said magnetic field for sensing electrical field; and,
    high gain amplifier means for greatly amplifying said perturbations.

14. The geophone as defined in claim 13 wherein half of said ring is of a first known diameter and the other half of said ring is of a smaller known diameter.

* * * * *